(12) United States Patent
Dupont

(10) Patent No.: US 9,657,639 B2
(45) Date of Patent: May 23, 2017

(54) VENTILATION SYSTEM AND METHOD FOR MONITORING AIR FLOW IN A VENTILATION SYSTEM FOR A TURBOMACHINE ASSEMBLY

(71) Applicant: General Electric Company, Schenectady, NY (US)

(72) Inventor: Denis Dupont, Belfort (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 343 days.

(21) Appl. No.: 14/219,211

(22) Filed: Mar. 19, 2014

(65) Prior Publication Data
US 2015/0099450 A1  Apr. 9, 2015

(30) Foreign Application Priority Data

Oct. 7, 2013 (FR) ...................... 13 59714

(51) Int. Cl.

| | |
|---|---|
| F02C 7/00 | (2006.01) |
| F02C 7/18 | (2006.01) |
| F02B 63/04 | (2006.01) |
| F02B 77/13 | (2006.01) |
| F01P 5/06 | (2006.01) |
| F01P 7/04 | (2006.01) |
| F02C 7/12 | (2006.01) |
| F02C 7/20 | (2006.01) |
| F24F 7/08 | (2006.01) |
| F24F 11/00 | (2006.01) |
| F01D 25/14 | (2006.01) |

(52) U.S. Cl.
CPC ............... *F02C 7/00* (2013.01); *F01D 25/14* (2013.01); *F24F 7/08* (2013.01); *F24F 11/0001* (2013.01); *F05D 2260/608* (2013.01); *F05D 2270/3062* (2013.01); *F24F 2011/0006* (2013.01); *F24F 2011/0038* (2013.01)

(58) Field of Classification Search
CPC .......................................................... F02C 7/00
USPC ................................................. 454/252, 256
See application file for complete search history.

(56) References Cited

U.S. PATENT DOCUMENTS 5,682,826 A * 11/1997 Hollenbeck ............. F23N 1/062
                                                                110/147
6,983,607 B2    1/2006 Grove et al.
(Continued)

FOREIGN PATENT DOCUMENTS

JP        2012-180801        9/2012

*Primary Examiner* — Gregory Huson
*Assistant Examiner* — Eric Gorman
(74) *Attorney, Agent, or Firm* — Dority & Manning, PA

(57) ABSTRACT

Ventilation systems for enclosing turbomachine assembly components and methods for monitoring air flow in ventilation systems are provided. A ventilation system includes an enclosure defining an interior, an air inlet circuit in fluid communication with the interior for flowing air into the interior, and an air outlet circuit in fluid communication with the interior for flowing air from the interior. The ventilation system further includes a fan disposed within one of the air outlet circuit or the air inlet circuit, and a motor in operable communication with the fan for driving the fan. The ventilation system further includes an electrical measurement device, the electrical measurement device in communication with the motor and operable to measure an electrical characteristic of the motor.

14 Claims, 5 Drawing Sheets

(56) References Cited

U.S. PATENT DOCUMENTS

| | | | | |
|---|---|---|---|---|
| 9,091,215 B2* | 7/2015 | Baten | ............ | F02C 3/32 |
| 2004/0101412 A1* | 5/2004 | Kallman | ............ | F04D 27/004 |
| | | | | 417/44.1 |
| 2007/0026786 A1* | 2/2007 | Liu | ............ | F23J 11/02 |
| | | | | 454/61 |
| 2009/0288577 A1* | 11/2009 | Kumar | ............ | B60L 11/02 |
| | | | | 105/36 |
| 2010/0066088 A1* | 3/2010 | Matsushita | ............ | F03D 80/00 |
| | | | | 290/44 |
| 2012/0199102 A1* | 8/2012 | Hoefer | ............ | F02B 1/08 |
| | | | | 123/458 |
| 2014/0020394 A1* | 1/2014 | Laing | ............ | F02C 7/00 |
| | | | | 60/772 |
| 2015/0056912 A1* | 2/2015 | Scipio | ............ | F24F 11/053 |
| | | | | 454/258 |

* cited by examiner

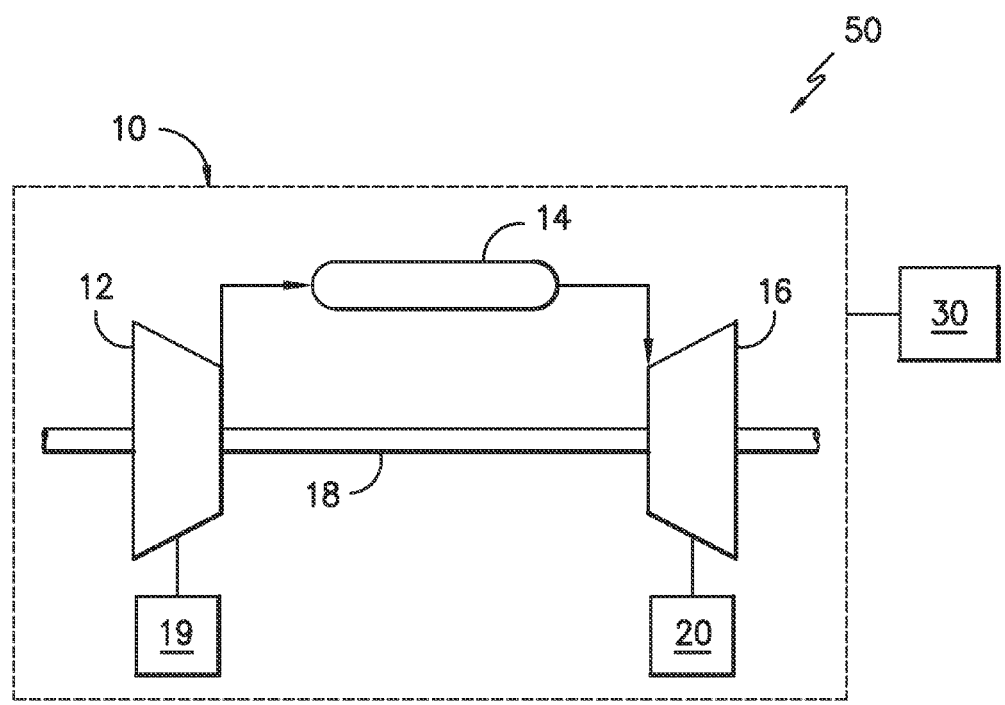
FIG. -1-

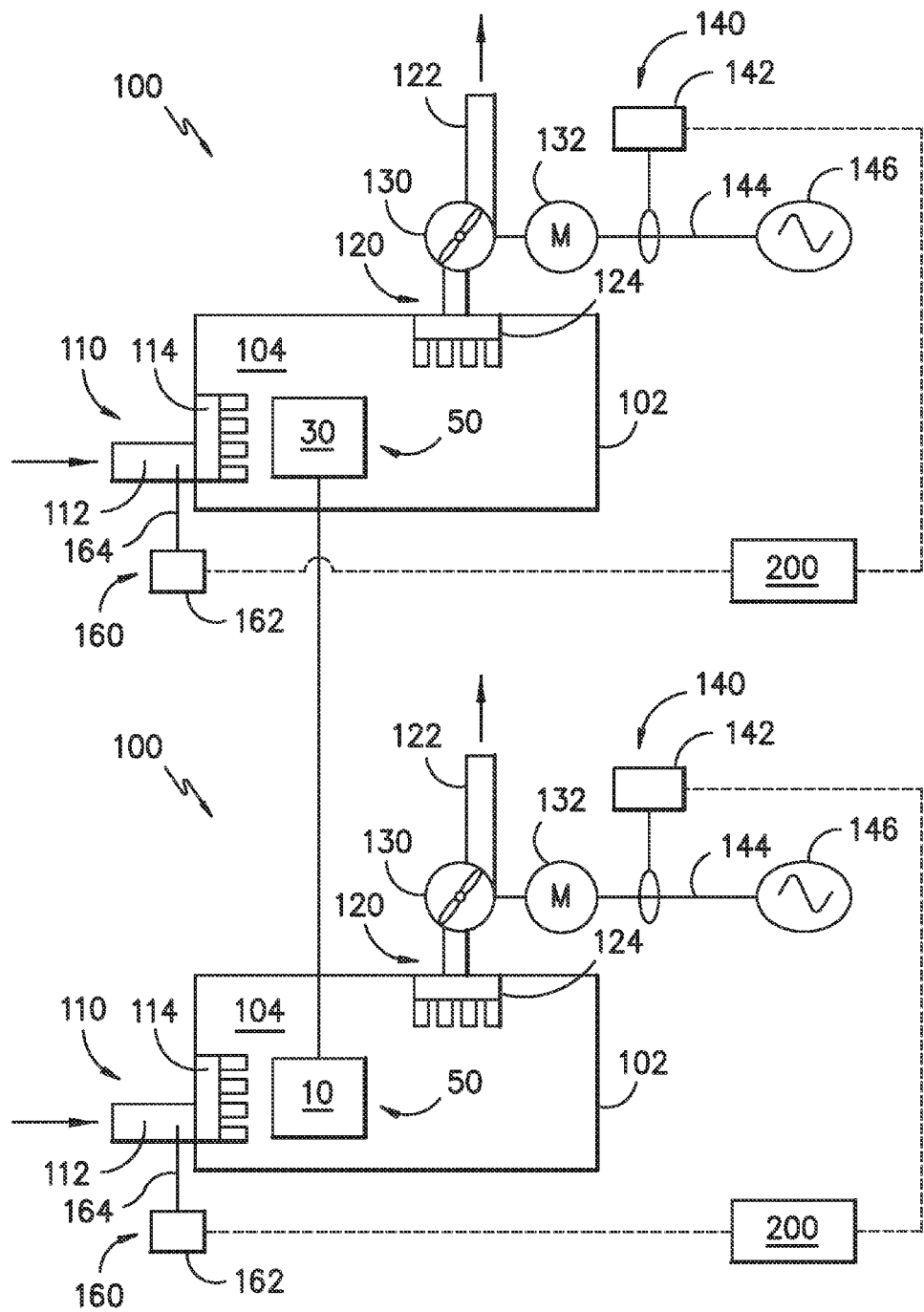
FIG. -2-

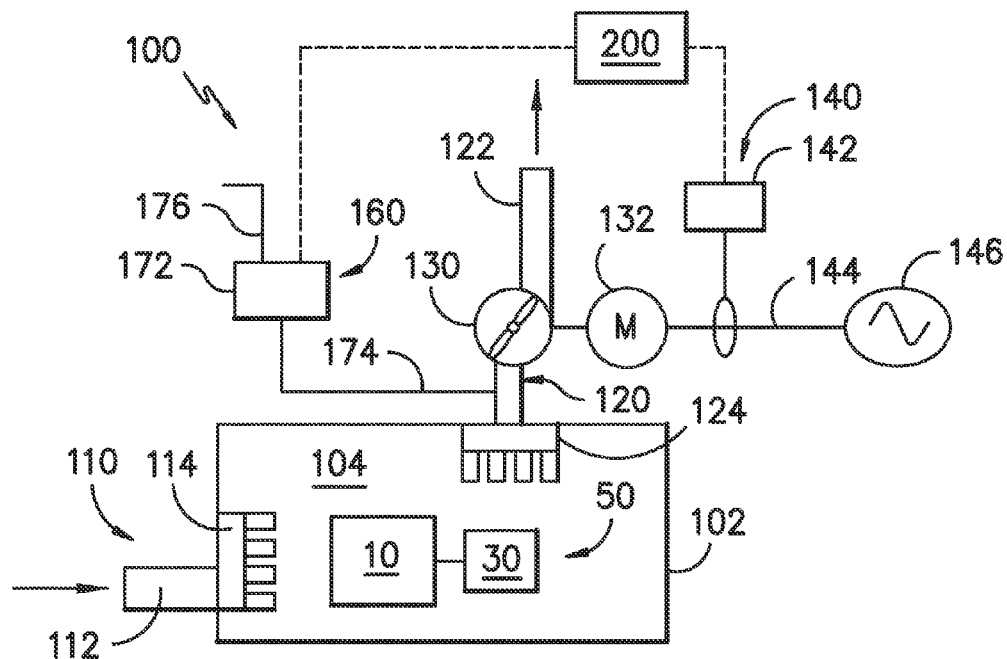
FIG. -3-
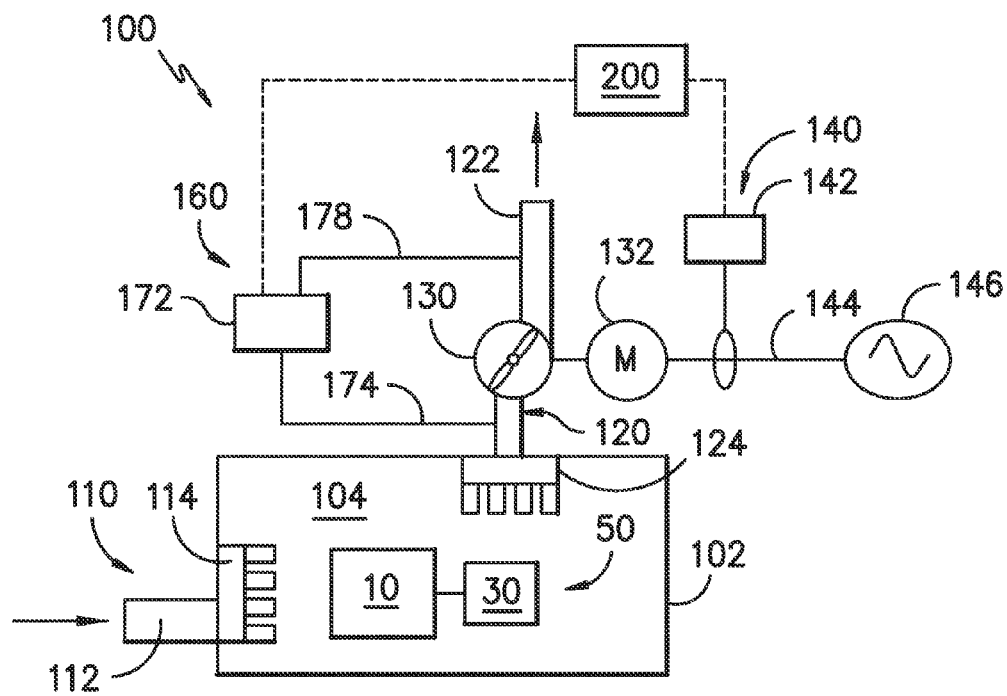
FIG. -4-

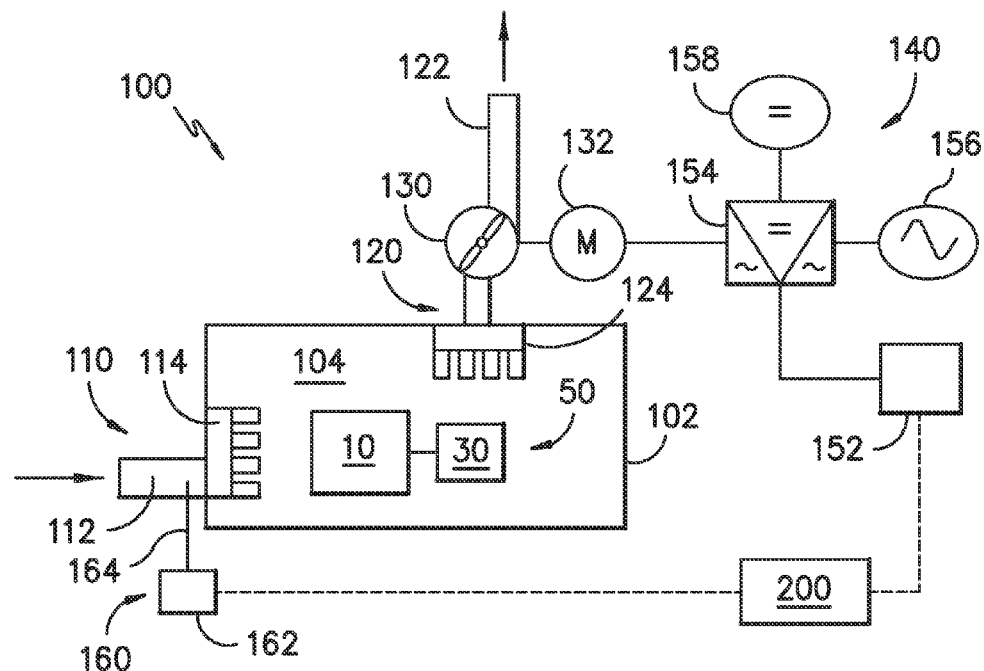
FIG. -5-
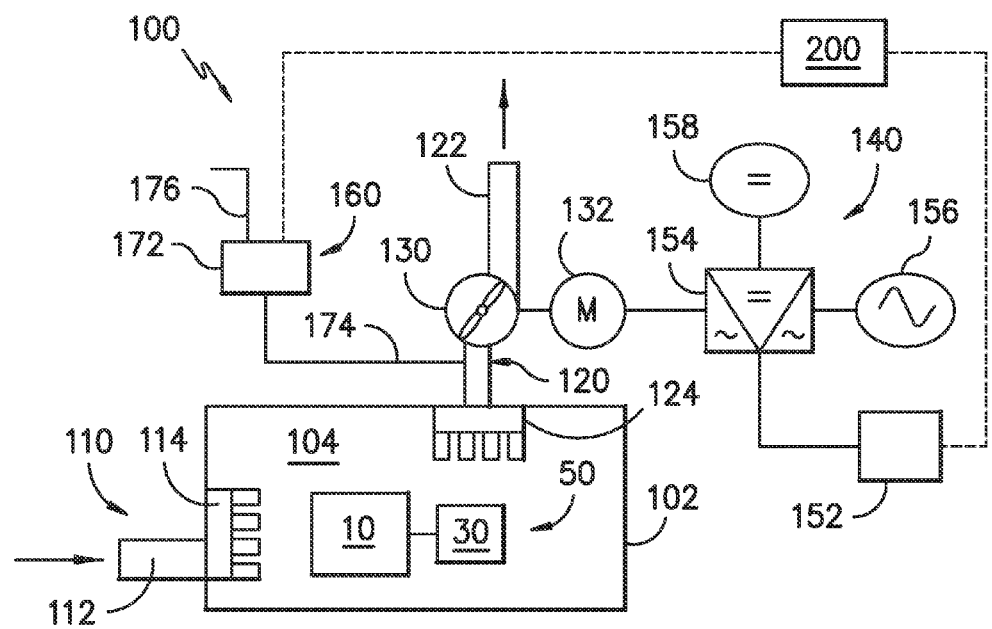
FIG. -6-

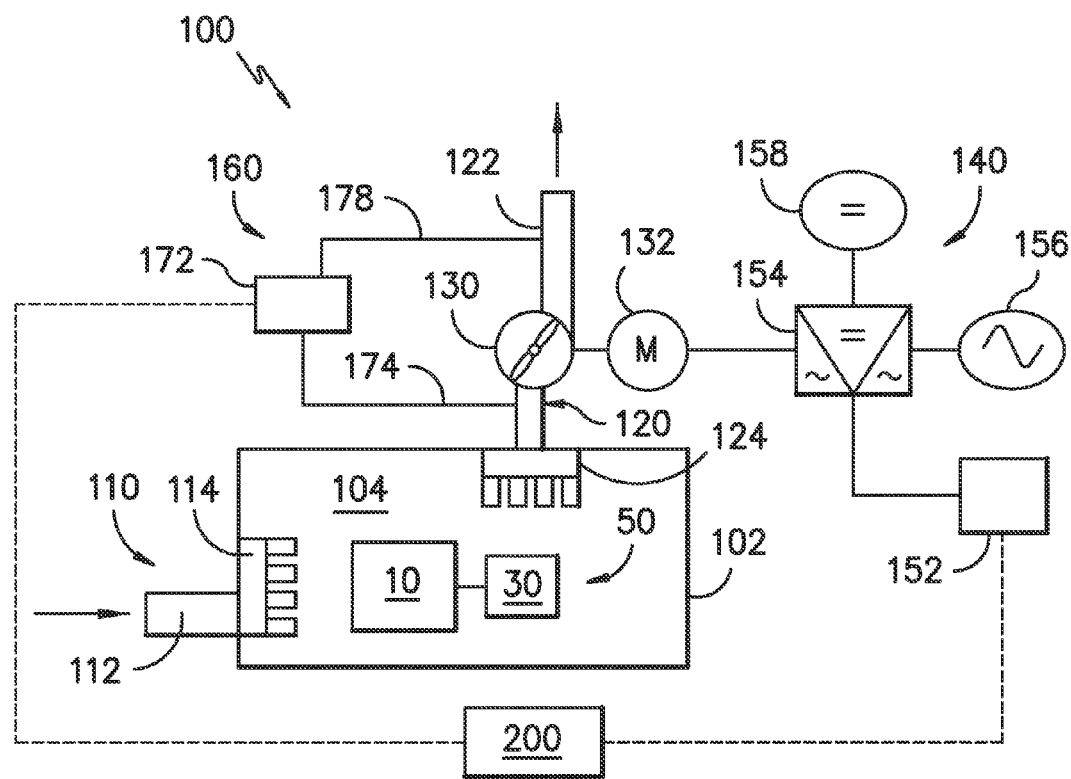
FIG. -7-

VENTILATION SYSTEM AND METHOD FOR MONITORING AIR FLOW IN A VENTILATION SYSTEM FOR A TURBOMACHINE ASSEMBLY

PRIORITY INFORMATION

The present application claims priority to French Patent Application No. 1359714, filed on Oct. 7, 2013 and entitled "Système de ventilation pour machine tournante".

FIELD OF THE INVENTION

The present disclosure relates generally to turbomachine assemblies, which may include for example a gas turbine system and an accessory assembly therefor. In particular, the present disclosure relates to ventilation systems and methods for monitoring air flow in ventilation systems for such turbomachine assemblies.

BACKGROUND OF THE INVENTION

Turbomachines are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

A turbomachine is typically coupled with an accessory assembly (which may provide and monitor, for example, fluids supplied to the turbomachine) to form a turbomachine assembly. In the field, it is typically desirable to shield the turbomachine assembly from external environmental factors, such as rain, dust, heat, wind, etc. Additionally, it is desirable to reduce the noise generated by the turbomachine assembly and to protect operators in case of accidents such as, for example, fire or explosion. Accordingly, at least one component of the turbomachine assembly, such as the turbomachine and/or the accessory assembly or assemblies, may be housed within an enclosure.

Within the enclosure, elevated temperatures can cause regulating devices and sensors within the enclosure to malfunction or fail. Additionally, gas leaks can occur from the turbomachine into the enclosure. Accordingly, ventilation components are utilized with the enclosure to form a ventilation system housing the component(s) of the turbomachine assembly. The ventilation system can generally remove heat from and dilute gas in the enclosure.

A ventilation system typically includes a gas leak detection system, which can be installed for example in an air outlet circuit of the system. The gas leak detection system generally detects gas leaks in the enclosure and monitors the leaks relative to predetermined levels in order to avoid explosion risks, etc. The ventilation system further generally produces at least a minimum air flow therethrough to ensure sufficient flow through the air outlet circuit such that the gas leak detection system functions properly. If gas levels in the enclosure exceed predetermined levels, the turbomachine may be designed to trip, such that the fuel supply to the turbomachine is cut off.

Currently, various mechanical devices are utilized to measure air flow in the ventilation system, to ensure that a sufficient air flow level is occurring in the ventilation system to provide sufficient ventilation. If the air flow in the system drops below a minimum level, the turbomachine may be designed to trip. The mechanical devices may, for example, measure velocity and/or relative pressure in the air inlet circuit and air outlet circuit of the system. However, the use of mechanical devices can have various drawbacks, and can lead in some cases to false low air flow measurements. For example, the local effects of wind speed increases and wind directions changes, such as during storms, as well as other climatic disturbances, can lead to faulty air flow measurements. While time delays before tripping have been utilized in an attempt to reduce the impact of such faulty air flow measurements, most local effects that cause such faulty measurements occur for periods of time that are longer than the prescribed time delays. Longer time delays would increase the risk of explosion, etc. if an actual low air flow event were to occur. Additionally, while walls and/or various other protection systems have been utilized to shield the ventilation system from such climatic disturbances, these systems can be expensive, inefficient, and in many case insufficient.

Accordingly, improved ventilation systems and methods for monitoring air flow in ventilation systems for turbomachine assemblies are desired in the art. In particular, systems and methods which provide improved low air flow detection by reducing or preventing false low air flow measurements would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a ventilation system for enclosing a turbomachine assembly component is provided. The ventilation system includes an enclosure defining an interior, an air inlet circuit in fluid communication with the interior for flowing air into the interior, and an air outlet circuit in fluid communication with the interior for flowing air from the interior. The ventilation system further includes a fan disposed within one of the air outlet circuit or the air inlet circuit, and a motor in operable communication with the fan for driving the fan. The ventilation system further includes an electrical measurement device, the electrical measurement device in communication with the motor and operable to measure an electrical characteristic of the motor.

In accordance with another embodiment, a turbomachine assembly is provided. The turbomachine assembly includes a turbomachine, an accessory assembly, and a ventilation system enclosing at least one of the turbomachine or the accessory assembly. The ventilation system includes an enclosure defining an interior, an air inlet circuit in fluid communication with the interior for flowing air into the interior, and an air outlet circuit in fluid communication with the interior for flowing air from the interior. The ventilation system further includes a fan disposed within one of the air outlet circuit or the air inlet circuit, and a motor in operable communication with the fan for driving the fan. The ventilation system further includes an electrical measurement device, the electrical measurement device in communication with the motor and operable to measure an electrical characteristic of the motor.

In accordance with another embodiment, a method for monitoring air flow in a ventilation system for a turbomachine assembly is provided. The method includes measuring a flow characteristic of air within one of an air inlet circuit or an air outlet circuit of the ventilation system, and measuring an electrical characteristic of a motor of a fan disposed within the air outlet circuit. The method further includes comparing the flow characteristic to a predetermined flow threshold, and comparing the electrical characteristic to a predetermined electrical threshold. The method further includes indicating that a minimum air flow threshold has been reached if the flow characteristic is below the predetermined flow threshold and the electrical characteristic is below the predetermined electrical threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic view of a turbomachine assembly in accordance with one embodiment of the present disclosure;

FIG. 2 provides a schematic view of multiple ventilation systems enclosing a turbomachine and an accessory assembly of a turbomachine assembly in accordance with one embodiment of the present disclosure;

FIG. 3 provides a schematic view of a ventilation system enclosing a turbomachine assembly in accordance with another embodiment of the present disclosure;

FIG. 4 provides a schematic view of a ventilation system enclosing a turbomachine assembly in accordance with another embodiment of the present disclosure;

FIG. 5 provides a schematic view of a ventilation system enclosing a turbomachine assembly in accordance with another embodiment of the present disclosure;

FIG. 6 provides a schematic view of a ventilation system enclosing a turbomachine assembly in accordance with another embodiment of the present disclosure; and FIG. 7 provides a schematic view of a ventilation system enclosing a turbomachine assembly in accordance with another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbomachine assembly 50 in accordance with one embodiment of the present disclosure. In the embodiment shown, the turbomachine is a gas turbine system 10. It should be understood that the turbomachine of the present disclosure need not be a gas turbine system 10, but rather may be any suitable turbine system or other turbomachine, such as a steam turbine system or other suitable system. The system 10 as shown may include a compressor section 12, a combustor section 14 which may include a plurality of combustors, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. An inlet section 19 may provide an air flow to the compressor section 12, and exhaust gases may be exhausted from the turbine section 16 through an exhaust section 20 and exhausted and/or utilized in the system 10 or other suitable system. Exhaust gases from the system 10 may for example be exhausted into the atmosphere, flowed to a steam turbine or other suitable system, or recycled through a heat recovery steam generator.

The turbomachine assembly 50 further includes an accessory assembly 30 for use with the turbomachine. The accessory assembly 30 may be or include, for example, a gas module to control gas flow to the turbomachine (such as a gas skid), a water injection module to control water flow injected into combustion chambers of the turbomachine and to reduce the emission of NOx, an oil module to control the oil flow to lubricate the bearings of the turbomachine, or a liquid fuel module to control the liquid fuel flow to the turbomachine. Alternatively, an accessory assembly 30 may be or include any suitable modules or components thereof that are utilized during operation of the turbomachine.

Referring now to FIGS. 2 through 7, various embodiments of ventilation systems 100, in which one or more components of a turbomachine assembly 50 such as a turbomachine and/or accessory assembly 30 are enclosed, are provided. FIG. 2 illustrates multiple ventilation systems 100, each of which encloses another component of the turbomachine assembly 50. For example, as illustrated, one ventilation system 100 encloses a turbomachine, and another ventilation system 100 encloses an accessory assembly 30 connected to the turbomachine. FIGS. 3 through 7 illustrate a single ventilation system 100 which encloses both a turbomachine and an accessory assembly 30. A turbomachine assembly 50 may generally include a turbomachine, an accessory assembly 30, and one or more ventilation systems 100. The ventilation system 100 may include an enclosure 102 which defines an interior 104 of the ventilation system 100. The enclosure 102 may typically be formed from a suitable metal, although any suitable material may be utilized. Further, the enclosure 102 may have any suitable size and shape generally capable of housing required components of a turbomachine assembly 50.

The system 100 may further include an air inlet circuit 110, which may generally provide external air to the enclosure 102. The circuit 110 is thus in fluid communication with the interior 104 for flowing air into the interior 104. The air inlet circuit 110 may include, for example, a duct 112 through which air enters the circuit 110. The air may flow through the duct 112 into the interior 104 or, for example, into other suitable ducting such as an air distribution manifold 114. The air may in these embodiments flow from the manifold 114 into the interior 104.

The system 100 may further include an air outlet circuit 120, which may generally flow air from the enclosure 102 into the atmosphere external to the enclosure 102. The circuit 120 is thus in fluid communication with the interior 104 for flowing air from the interior 104. The air outlet circuit 120 may include, for example, a duct 122 through which air is exhausted. The air may flow directly into the duct 122 from the interior 104 or, for example, from other suitable ducting such as an air collection manifold 124 into the duct 122. The air may be exhausted from the duct 122.

A fan 130 may be disposed within the air outlet circuit 120, such as within the duct 122 thereof, or alternatively within the air inlet circuit 110, such as within the duct 112 thereof. A motor 132 may be coupled to the fan 130 and in operable communication with the fan 130 for driving the fan 130. Operation of the fan 130 generally facilitates the flow of air through the system 100. In general, a minimum air flow level is maintained by the fan 130 within the system 100 to ensure that, if a gas leak, etc., occurs, the gas is flowed from the system 100 through the air outlet circuit 120.

As illustrated, a system 100 according to the present disclosure further includes an electrical measurement device 140. The electrical measurement device 140 may be in communication with the motor 132, and may be operable to measure an electrical characteristic of the motor 132. Accordingly, the device 140 may monitor performance of the motor 132 and thus act to verify that the system 100 is experiencing at least the minimum air flow level. Advantageously, because such device 140 is an electrical measurement device 140 which measures electrical characteristics, it will not be influenced by external factors such as climatic disturbances, and will not provide false low air flow measurements based on these external factors.

In one exemplary embodiment, as illustrated for example in FIGS. 2 through 4, the electrical characteristic that is measured is electrical current absorbed by the motor 132. For example, the device 140 may include a current measurement device 142 which measures current in an electrical line 144. The line 144 may supply electricity to the motor 132 from for example, an electrical source 146, such as an electrical network having AC voltage. In some embodiments, the device 140 may be, for example, a shunt or a Hall effect current sensor.

In another exemplary embodiment, as illustrated for example in FIGS. 5 through 7, the electrical characteristic that is measured is electrical power supplied to the motor 132. For example, the device 140 may include a power measurement device 152 which measures power of, for example, a variable frequency driver 154. The driver 154 may supply electricity to the motor 132 from, for example, an electrical source 156, such as an electrical network having AC voltage, and/or an emergency electrical source 158, such as an electrical network having DC voltage.

As discussed, the device 140 may monitor performance of the motor 132 and thus act to verify that the system 100 is experiencing at least the minimum air flow level. The output mechanical power supplied by the motor 132 on its end shaft is given by the following relationship:

$$P = \sqrt{3} * U * I * \cos \phi * \eta 1$$

wherein U is the electrical voltage in volts, I is the line current in amperes, $\Phi$ is the difference of phase between the voltage and the line current, cos $\Phi$ is the power factor, and $\eta 1$ is the efficiency of the motor.

The motor 132 may generally have a rated power Pn that it can provide at, for example, an ambient temperature of 40° C. The motor 14 may also have a rated current, which may be the line current when the motor output power is Pn.

The mechanical power P necessary to drive the fan 130, such as an impeller thereof, and to produce the minimum air flow level and associated pressure in the system 100 is given by the following relationship:

$$P = \frac{\Delta p * Q v}{\eta 2}$$

wherein $\Delta p$ is the differential total pressure in Pascals between the inlet and the outlet of the fan 130, Qv is the fan flow in m³/s, and $\eta 2$ is the efficiency of the fan.

The output mechanical power supplied by the motor 132 on its end shaft may be equal to the mechanical power necessary to drive the fan 130 and to produce the minimum air flow level and associated pressure in the system 100. The mechanical power and the air flow level of the system 100 may be linked by the preceding relationships. A low power equate to a low air flow level.

It is also possible to monitor and measure the air flow level using the electrical power supplied to the motor 132 instead of the mechanical power. The electrical power is given by the following relationship:

$$P = \sqrt{3} * U * I * \cos \phi$$

wherein U is the electrical voltage in volts, I is the line current in amperes, $\Phi$ is the difference of phase between the voltage and the line current, and cos $\Phi$ is the power factor.

It is also possible to monitor and measure the air flow level directly with the line current I as the electrical power is proportional to this line current according to the preceding relationship.

As further illustrated in FIGS. 2 through 7, a ventilation system 100 according to the present disclosure may further include a mechanical measurement device 160. The mechanical measurement device 160 may be operable to measure a flow characteristic of the air within one of the air inlet circuit 110 or the air outlet circuit 120. Accordingly, the device 160 may directly monitor the air flow within the system 100 and thus act to verify that the system 100 is experiencing at least the minimum air flow level. In some embodiments, the device 160 may be a primary device, with the electrical measurement device 140 being a secondary device. Alternatively, the device 140 may be the primary device with the device 160 being a secondary device, or the devices 140, 160 may be dual primary devices.

In some embodiments, the flow characteristic of the air may be the velocity of the air. For example, as illustrated in FIGS. 2 and 5, the mechanical measurement device 160 may include a velocity sensor 162. The velocity sensor 162 may be disposed within the air inlet circuit 110, such as within the duct 112 thereof, as illustrated or within the air outlet circuit 120, and may thus measure the velocity of air flowing therethrough. As illustrated, a sensing component 164 of the velocity sensor 162 extends into the duct 112, such that the sensor 162 is disposed within the duct 112. The velocity sensor 162 may be or include, for example, an anemometer, such as a rotating vane anemometer or a thermal anemometer.

In other embodiments, the flow characteristic of the air may be the pressure of the air. For example, as illustrated in FIGS. 3 and 6, the mechanical measurement device 160 may include a pressure sensor 172. The pressure sensor 172 may be positioned to measure a difference between an atmospheric pressure (external to the system 100, and a pressure within the system 100, such as within the air outlet circuit 120. For example, tubing 174 other suitable sensing apparatus may extend between the pressure sensor 172 and, for example, a location at the inlet or otherwise upstream of the fan 130. Additionally, tubing 176 or other suitable sensing apparatus may extend external to the system 100. The differential pressure between the tubings 174, 176 or other suitable sensing apparatus may be measured by the pressure sensor 172.

In still other embodiments, as illustrated in FIGS. 4 and 7, the pressure sensor 172 may be positioned to measure a difference between the pressure upstream of the fan 130 and downstream of the fan 130. For example, tubing 174 other suitable sensing apparatus may extend between the pressure sensor 172 and, for example, a location at the inlet or otherwise upstream of the fan 130. Additionally, tubing 178 or other suitable sensing apparatus may extend between the pressure sensor 172 and, for example, a location at the outlet or otherwise downstream of the fan 130. The differential pressure between the tubings 174, 178 or other suitable sensing apparatus may be measured by the pressure sensor 172.

The pressure sensor 172 may be or include, for example, a suitable pressure switch or pressure transmitter.

In some embodiments wherein the mechanical measurement device 160 is the primary device and the electrical measurement device 140 is the secondary device, the measurements from the electrical measurement device 140 may only be utilized in a predetermined threshold flow level is reached and the mechanical measurement device 160 is thus indicating a low air flow event. Accordingly, the electrical measurement device 140 may act as a back-up and safeguard before tripping of the turbomachine due to the low air flow event.

In some embodiments, the system 100 further includes a controller 200. The controller 200 may be in communication with the electrical measurement device 140 and the mechanical measurement device 160, and may compare measurements from the devices 140, 160 to predetermined threshold levels.

It should be appreciated that the controller 200 may generally comprise a computer or any other suitable processing unit. Thus, in several embodiments, the controller 200 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 200 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 200 to perform various computer-implemented functions. In addition, the controller 200 may also include various input/output channels for receiving inputs from and sending control signals to sensors and/or other measurement devices, such as the electrical measurement device 140 and the mechanical measurement device 160.

Accordingly, the controller 200 may in some embodiments be operable to indicate that a minimum air flow threshold has been reached if the flow characteristic from the mechanical measurement device 160 is below a predetermined flow threshold and the electrical characteristic from the electrical measurement device 140 is below a predetermined electrical threshold. Further, in some embodiments, the controller 200 may evaluate the electrical characteristic only if the flow characteristic is below the predetermined flow threshold.

The present disclosure is further directed to a method for monitoring air flow in a ventilation system 100 for a turbomachine assembly 50. The method may include, for example, measuring a flow characteristic of air within one of an air inlet circuit 110 or an air outlet circuit 120 of the ventilation system 100, as discussed herein. The method may further include, for example, measuring an electrical characteristic of a motor 132 of a fan 130 disposed within the air outlet circuit 120, as discussed herein. The method may further include, for example, comparing the flow characteristic to a predetermined flow threshold, and comparing the electrical characteristic to a predetermined electrical threshold, as discussed herein. The method may further include, for example, indicating that a minimum air flow threshold has been reached if the flow characteristic is below the predetermined flow threshold and the electrical characteristic is below the predetermined electrical threshold. Such indication may be provided, for example, as an output by the controller 200. Notably, in exemplary embodiments, no indication is provided if the flow characteristic is below the predetermined flow threshold but the electrical characteristic is not below the predetermined electrical threshold.

In some embodiments, as discussed herein, the step of comparing the electrical characteristic to a predetermined electrical threshold occurs only if the flow characteristic is below the predetermined flow threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ventilation system for enclosing a turbomachine assembly component, the ventilation system comprising:
   an enclosure defining an interior;
   an air inlet circuit in fluid communication with the interior for flowing air into the interior;
   an air outlet circuit in fluid communication with the interior for flowing air from the interior;
   a fan disposed within one of the air outlet circuit or the air inlet circuit;
   a motor in operable communication with the fan for driving the fan;
   a mechanical measurement device, the mechanical measurement device operable to measure a flow characteristic of the air within one of the air inlet circuit or the air outlet circuit;
   an electrical measurement device, the electrical measurement device in communication with the motor and operable to measure an electrical characteristic of the motor; and
   a controller, the controller operable to indicate that a minimum air flow threshold has been reached if the flow characteristic is below a predetermined flow threshold and the electrical characteristic is below a predetermined electrical threshold, wherein the controller compares the electrical characteristic to the predetermined electrical threshold only if the flow characteristic is below the predetermined flow threshold.

2. The ventilation system of claim 1, wherein the fan is disposed within the air outlet circuit.

3. The ventilation system of claim 1, wherein the electrical characteristic is electrical power supplied to the motor.

4. The ventilation system of claim 1, wherein the electrical characteristic is electrical current absorbed by the motor.

5. The ventilation system of claim 1, wherein the mechanical measurement device is a primary device, and wherein the electrical measurement device is a secondary device.

6. The ventilation system of claim 1, wherein the mechanical measurement device comprises a velocity sensor disposed within the air inlet circuit.

7. The ventilation system of claim 1, wherein the mechanical measurement device comprises a pressure sensor positioned to measure a difference between an atmospheric pressure and a pressure within the air outlet circuit.

8. The ventilation system of claim 1, wherein the mechanical measurement device comprises a pressure sensor positioned to measure a difference between a pressure within the air outlet circuit upstream of the fan and a pressure within the air outlet circuit downstream of the fan.

9. A turbomachine assembly, comprising:
a turbomachine;
an accessory assembly; and
a ventilation system enclosing at least one of the turbomachine or the accessory assembly, the ventilation system comprising:
an enclosure defining an interior;
an air inlet circuit in fluid communication with the interior for flowing air into the interior;
an air outlet circuit in fluid communication with the interior for flowing air from the interior;
a fan disposed within one of the air outlet circuit or the air inlet circuit;
a motor in operable communication with the fan for driving the fan;
a mechanical measurement device, the mechanical measurement device operable to measure a flow characteristic of the air within one of the air inlet circuit or the air outlet circuit;
an electrical measurement device, the electrical measurement device in communication with the motor and operable to measure an electrical characteristic of the motor; and
a controller, the controller operable to indicate that a minimum air flow threshold has been reached if the flow characteristic is below a predetermined flow threshold and the electrical characteristic is below a predetermined electrical threshold, wherein the controller compares the electrical characteristic to the predetermined electrical threshold only if the flow characteristic is below the predetermined flow threshold.

10. The turbomachine assembly of claim 9, wherein the mechanical measurement device is a primary device, and wherein the electrical measurement device is a secondary device.

11. A method for monitoring air flow in a ventilation system for a turbomachine assembly, the method comprising:
measuring, with a mechanical measurement device, a flow characteristic of air within one of an air inlet circuit or an air outlet circuit of the ventilation system;
measuring, with an electrical measurement device, an electrical characteristic of a motor of a fan disposed within the air outlet circuit;
comparing, with a controller, the flow characteristic to a predetermined flow threshold;
comparing, with a controller, the electrical characteristic to a predetermined electrical threshold only if the flow characteristic is below the predetermined flow threshold; and
indicating, with a controller, that a minimum air flow threshold has been reached if the flow characteristic is below the predetermined flow threshold and the electrical characteristic is below the predetermined electrical threshold.

12. The method of claim 11, wherein the electrical characteristic is electrical power supplied to the motor.

13. The method of claim 11, wherein the electrical characteristic is electrical current absorbed by the motor.

14. The method of claim 11, wherein the flow characteristic is one of air velocity or air pressure.

\* \* \* \* \*